(12) United States Patent
Ghafoorian et al.

(10) Patent No.: US 12,511,889 B2
(45) Date of Patent: Dec. 30, 2025

(54) NEURAL NETWORK MODELS FOR SEMANTIC IMAGE SEGMENTATION

(71) Applicant: TomTom Global Content B.V., Amsterdam (NL)

(72) Inventors: Mohsen Ghafoorian, Diemen (NL); Klaus Michael Hofmann, Amsterdam (NL); Erik Stammes, Barcelona (ES)

(73) Assignee: TomTom Global Content B.V., Amsterdam (NL)

( * ) Notice: Subject to any disclaimer, the term of this patent is extended or adjusted under 35 U.S.C. 154(b) by 281 days.

(21) Appl. No.: 18/034,897

(22) PCT Filed: Oct. 29, 2021

(86) PCT No.: PCT/EP2021/080158
§ 371 (c)(1),
(2) Date: May 2, 2023

(87) PCT Pub. No.: WO2022/090483
PCT Pub. Date: May 5, 2022

(65) Prior Publication Data
US 2023/0419648 A1 Dec. 28, 2023

(30) Foreign Application Priority Data
Nov. 2, 2020 (GB) ...................... 2017369

(51) Int. Cl.
*G06V 10/82* (2022.01)
*G06V 10/72* (2022.01)

(52) U.S. Cl.
CPC .............. *G06V 10/82* (2022.01); *G06V 10/72* (2022.01)

(58) Field of Classification Search
CPC ............................... G06V 10/82; G06V 10/72
See application file for complete search history.

(56) References Cited

U.S. PATENT DOCUMENTS

| | | |
|---|---|---|
| 10,713,794 B1 | 7/2020 | He et al. |
| 2020/0027002 A1 | 1/2020 | Hickson et al. |
| 2020/0143204 A1 | 5/2020 | Nakano et al. |

FOREIGN PATENT DOCUMENTS

| | | |
|---|---|---|
| CN | 109191392 A | 1/2019 |
| CN | 109543502 A | 3/2019 |

(Continued)

OTHER PUBLICATIONS

Wei et al, "Object Region Mining with Adversarial Erasing: A Simple Classification to Semantic Segmentation Approach", 2017, Proceedings of the IEEE conference on computer vision and pattern recognition, pp. 1568-1576 (Year: 2017).*

(Continued)

*Primary Examiner* — David F Dunphy
(74) *Attorney, Agent, or Firm* — Buckley, Maschoff & Talwalkar LLC

(57) ABSTRACT

The invention relates to a method of training a model for use in semantic image segmentation. The model includes a first classifier neural network and a second classifier neural network. The method includes training the first network by inputting a first training image containing a target object to the first network, using the first network to identify and erase pixels of the first training image that are discriminative for the target object, inputting the first training image to the second network, using the second network to determine a likelihood of the first modified training image containing the target object and updating weights of the first network using a first loss function that is a monotonically-increasing function of the determined likelihood.

19 Claims, 6 Drawing Sheets

(56) References Cited

FOREIGN PATENT DOCUMENTS

| CN | 110111340 A | 8/2019 |
|---|---|---|
| CN | 110245665 A | 9/2019 |
| CN | 110458221 A | 11/2019 |
| CN | 110880001 A | 3/2020 |

OTHER PUBLICATIONS

Zhang et al, "Automatic Image Labelling at Pixel Level", 2020, IEEE Transaction on Image Processing, arXiv: 2007.07415v2(13 Pages) (Year: 2020).*
International Search Report dated Dec. 23, 2021 for International patent application No. PCT/EP2021/073856.
GB Search Report dated Apr. 22, 2021 for GB application No. GB2017369.6.
Wei, Y et al., Object Region Mining with Adversarial Erasing: A Simple Classification to Semantic Segmentation Approach, arXiv:1703. 08448, https://arxiv.org/abs/1703.08448, 2018.
Zhang, X et al., Adversarial Complementary Learning for Weakly Supervised Object Localization, arXiv:1804.06962, https://arxiv.org/abs/1804.06962, 2018.

* cited by examiner

| Method | bkg | aero | bike | bird | boat | bottle | bus | car | cat | chair | cow |
|---|---|---|---|---|---|---|---|---|---|---|---|
| PSA | 86.7 | 53.2 | 29.1 | 76.7 | 44.2 | 67.7 | 85.2 | 72.4 | 71.7 | 26.7 | 76.5 |
| PSA w/EADER | 88.2 | 54.9 | 31.3 | 84.1 | 58.2 | 70.9 | 83.0 | 76.2 | 82.1 | 24.4 | 80.6 |
| Method | table | dog | horse | mbike | person | plant | sheep | sofa | train | tv | mean |
| PSA | 40.9 | 72.2 | 68.2 | 70.2 | 66.4 | 37.8 | 80.9 | 38.5 | 62.8 | 45.4 | 60.7 |
| PSA w/EADER | 35.8 | 80.7 | 76.4 | 73.7 | 70.8 | 15.4 | 77.2 | 34.6 | 66.4 | 52.6 | 62.8 |

FIG. 6A

| Method | bkg | aero | bike | bird | boat | bottle | bus | car | cat | chair | cow |
|---|---|---|---|---|---|---|---|---|---|---|---|
| PSA | 89.1 | 70.6 | 31.6 | 77.2 | 44.2 | 68.9 | 79.1 | 66.5 | 74.9 | 29.6 | 68.7 |
| PSA w/EADER | 89.1 | 53.7 | 33.6 | 81.6 | 52.1 | 69.5 | 82.7 | 74.3 | 86.0 | 26.7 | 79.1 |
| Method | table | dog | horse | mbike | person | plant | sheep | sofa | train | tv | mean |
| PSA | 56.1 | 82.1 | 64.8 | 78.6 | 73.5 | 50.8 | 70.7 | 47.7 | 63.9 | 51.1 | 63.7 |
| PSA w/EADER | 43.9 | 83.1 | 78.7 | 75.6 | 71.0 | 23.6 | 80.0 | 42.9 | 63.8 | 49.9 | 63.8 |

FIG. 6B

NEURAL NETWORK MODELS FOR SEMANTIC IMAGE SEGMENTATION

RELATED APPLICATIONS

The instant application is a national stage application of, and hereby claims priority to, pending PCT application no. PCT/EP2021/080158, which was filed on 29 Oct. 2021. The instant application also claims priority, via parent application PCT/EP2021/080158, to GB application no. 2017369.6, which was filed on 2 Nov. 2020. These applications are each incorporated by reference.

BACKGROUND OF THE INVENTION

This invention relates to neural network models for semantic image segmentation, and to methods and apparatus for training such models.

Convolutional neural networks (CNNs) have been successfully applied to various computer vision problems by posing these problems as image segmentation problems. Examples include road scene understanding for autonomous driving, and interpreting medical imaging. For such applications, networks are typically trained with multi-class per-pixel labels that together form an image-sized segmentation map or mask. The output of such a network is then again an image-sized map, representing per-pixel class probabilities.

In likelihood-based semantic segmentation, a neural network can be trained to perform semantic segmentation by training it on training data consisting of images (e.g. photographs) and corresponding human-labelled "ground-truth" segmentation maps. A final segmentation map for a given input image can subsequently be obtained from the trained network by applying the argmax function along the class dimension of the predicted probabilities (i.e. for each pixel, selecting the most probable classification). This segmentation map may be useful in, for example, enabling a self-driving car to determine whether an object in view is likely to be another vehicle or a pedestrian.

However, producing such pixel-level ground-truth labels is time-consuming and expensive. Recent advancements in weakly-supervised training show that reasonable performance can be obtained by using only image-level labels— i.e. training data consisting of images and corresponding sets of labels indicating which of a predetermined set of objects (classes) is present in each image. For example, an image of a street scene may be labelled as containing {"bicycle", "road", "vegetation"}.

A weakly-supervised image-level classifier neural network can be used as a proxy task for performing pixel-level image segmentation by extracting an attention map, also referred to herein as a class activation map, from the network, which identifies regions of the input image that the network considers to be discriminative for a particular target object. These regions represent where the network has focused in order to identify the object. By combining attention maps for each of the different possible classes the image might contain, it is possible to segment the image into the different objects. However, classification needs only the minimum evidence to make predictions, so such networks tend to focus on the most discriminative object regions, and so any resulting segmentation is likely to miss significant parts of the object. The network that has been trained to classifier dogs and cats may, for instance, discriminate principally on the heads of the animals, so any derived segmentation map may fail to classify the animals' bodies correctly. This "discriminative localization" problem typically leads to poor segmentation performance. It is especially prevalent in non-rigid object classes such as birds, cats, horses and sheep where the texture of the fur or skin is much less discriminative than other body parts such as heads or feet.

It has been proposed to address this problem by using a classifier network to identify the most discriminative object regions in an input image, and then training one or more further classifier networks on the same image with these regions removed, so that the further networks learn to find less discriminative regions that belong to the target object. Combining the attention maps from the multiple classifier networks can result a larger map having better coverage of the target object. See, for example, [Zhang, X., Wei, Y., Feng, J., Yang, Y., Huang, T. S.: Adversarial complementary learning for weakly supervised object localization. In: Proceedings of the IEEE Conference on Computer Vision and Pattern Recognition. (2018) 1325-1334] and [Wei, Y., Feng, J., Liang, X., Cheng, M. M., Zhao, Y., Yan, S.: Object region mining with adversarial erasing: A simple classification to semantic segmentation approach. In: Proceedings of the IEEE conference on computer vision and pattern recognition. (2017) 1568-1576].

It has also been proposed to train a single network to classify an image using an attention map that covers as much of the target object as possible. The network consists of two serialised streams having shared weights. The first "classifier" stream generates an attention map that is passed as input to the second "attention mining" stream. See [Li, K., Wu, Z., Peng, K. C., Ernst, J., Fu, Y.: Tell me where to look: Guided attention inference network. In: Proceedings of the IEEE Conference on Computer Vision and Pattern Recognition. (2018) 9215-9223].

However, the applicant has recognised that the performance of these known approaches can be improved upon. Thus, the present invention seeks to present an improved model for use in semantic image segmentation.

SUMMARY OF THE INVENTION

From a first aspect, the invention provides a method of training a model for use in semantic image segmentation, wherein the model comprises:
  a first classifier neural network; and
  a second classifier neural network,
wherein the method comprises training the first network by:
  inputting a first training image containing a target object to the first network;
  using the first network to identify pixels of the first training image that are discriminative for the target object;
  generating a first modified training image by attenuating or erasing the identified pixels of the first training image;
  inputting the first modified training image to the second network;
  using the second network to determine a likelihood of the first modified training image containing the target object; and
  updating weights of the first network using a first loss function that is a monotonically-increasing function of the determined likelihood, and
wherein the method comprises training the second network by:
  inputting a second training image, containing the target object, to the first network;

using the first network to identify pixels of the second training image that are discriminative for the target object;

generating a second modified training image by attenuating or erasing the identified pixels of the second training image;

inputting a set of training images to the second network, the set comprising the second modified training image and one or more training images that do not contain the target object; and for each training image of the set, using the second network to determine a likelihood of the respective training image containing the target object, and updating weights of the second network using a second loss function, different from the first loss function, wherein the second loss function is a monotonically-decreasing function of the determined likelihood when the training image contains the target object, and is a monotonically-increasing function of the determined likelihood when the training image does not contain the target object.

From a second aspect, the invention provides a computer processing system for training a model for use in semantic image segmentation, wherein the model comprises:
  a first classifier neural network; and
  a second classifier neural network,
wherein the computer processing system is configured to train the first network by:
  inputting a first training image containing a target object to the first network;
  using the first network to identify pixels of the first training image that are discriminative for the target object;
  generating a first modified training image by attenuating or erasing the identified pixels of the first training image;
  inputting the first modified training image to the second network;
  using the second network to determine a likelihood of the first modified training image containing the target object; and
  updating weights of the first network using a first loss function that is a monotonically-increasing function of the determined likelihood, and
wherein the computer processing system is configured to train the second network by:
  inputting a second training image, containing the target object, to the first network;
  using the first network to identify pixels of the second training image that are discriminative for the target object;
  generating a second modified training image by attenuating or erasing the identified pixels of the second training image;
  inputting a set of training images to the second network, the set comprising the second modified training image and one or more training images that do not contain the target object; and
  for each training image of the set, using the second network to determine a likelihood of the respective training image containing the target object, and updating weights of the second network using a second loss function, different from the first loss function, wherein the second loss function is a monotonically-decreasing function of the determined likelihood when the training image contains the target object, and is a monotonically-increasing function of the determined likelihood when the training image does not contain the target object.

From a third aspect, the invention provides computer software comprising instructions which, when executed on a computer processing system, cause the computer processing system to train a model for use in semantic image segmentation, wherein the model comprises:
  a first classifier neural network; and
  a second classifier neural network,
wherein the instructions cause the computer processing system to train the first network by:
  inputting a first training image containing a target object to the first network;
  using the first network to identify pixels of the first training image that are discriminative for the target object;
  generating a first modified training image by attenuating or erasing the identified pixels of the first training image;
  inputting the first modified training image to the second network;
  using the second network to determine a likelihood of the first modified training image containing the target object; and
  updating weights of the first network using a first loss function that is a monotonically-increasing function of the determined likelihood, and wherein the instructions cause the computer processing system to train the second network by:
  inputting a second training image, containing the target object, to the first network;
  using the first network to identify pixels of the second training image that are discriminative for the target object;
  generating a second modified training image by attenuating or erasing the identified pixels of the second training image;
  inputting a set of training images to the second network, the set comprising the second modified training image and one or more training images that do not contain the target object; and
  for each training image of the set, using the second network to determine a likelihood of the respective training image containing the target object, and updating weights of the second network using a second loss function, different from the first loss function, wherein the second loss function is a monotonically-decreasing function of the determined likelihood when the training image contains the target object, and is a monotonically-increasing function of the determined likelihood when the training image does not contain the target object.

From a fourth aspect, the invention provides computer software comprising instructions which, when executed on a computer processing system, cause the computer processing system to perform semantic image segmentation using the first classifier neural network of a model trained by a method as disclosed herein.

From a fifth aspect, the invention provides a computer processing system configured to implement the first classifier neural network of a model trained by a method as disclosed herein, for performing semantic image segmentation.

Thus it will be seen that, in accordance with the invention, two classifier neural networks are trained independently, in an adversarial manner, using two different loss functions.

The first classifier neural network is trained towards identifying discriminative regions that are sufficiently large that, once they are removed from the first training image, the second classifier neural network is unable to identify the target object. Meanwhile, the second network is separately trained to improve its classification performance on modified images generated by the first network, thereby forcing the first network to improve its performance. The model can thus be trained in an adversarial minimax fashion so that the first network learns to identify regions that conform accurately to the target object.

Once trained, the first classifier neural network may be used in an inference mode to perform accurate semantic image segmentation, e.g. by identifying respective sets of pixels in an input image that are discriminative for one or more target objects, and combining these sets of pixels (e.g. using an argmax operation) to produce a segmentation map for the input image.

For convenience, the first classifier neural network will be referred to herein as a "localizer" network, while the second classifier neural network will be referred to as the "adversarial" network.

It will be appreciated that this approach of having two independently-trained networks differs from models that use a single network, trained to minimise one loss function that contains both classification and attention-mining loss terms, e.g. as described in [Li, K., Wu, Z., Peng, K. C., Ernst, J., Fu, Y.: Tell me where to look: Guided attention inference network. In: Proceedings of the IEEE Conference on Computer Vision and Pattern Recognition. (2018) 9215-9223]. As explained below, the present approach has been found to provide better classification and localization performance, as it can better accommodate the different distributions of data that its two independently-trained networks operate on.

The localizer and adversarial networks may be any convolutional neural networks. They may be the same or different types of network. However, the localizer and adversarial networks are preferably two independent networks—i.e. having no shared weights.

Training the second network may comprise using the first network, with updated weights determined through training of the first network, to identify pixels of a training image that are discriminative for the target object. Training the first network may comprise using the second network, with updated weights determined through training of the second network, to determine a likelihood of a modified training image containing the target object.

The adversarial training may be performed iteratively—i.e. using an iterative, alternating training process. The localizer network may be trained on one of more training images, with the classifier network operating in an inference mode, e.g. during a first time period. The classifier network may be trained on one of more training images, with the localizer network operating in an inference mode, e.g. during a second time period, distinct from the first time period. The weights of the first network may be updated independently of the weights of the second network—i.e. without changing any weights of the adversarial network when updating weights of the localizer network, and without changing any weights of the localizer network when updating weights of the adversarial network. Training the model may comprise alternately training the first network and the second network. This alternating training may be repeated a plurality of times—e.g. for tens, hundreds or thousands of cycles.

The second training image may be different from the first training image, or it may be the same. More generally, the networks may be trained on a common plurality of training images, or they may be trained on distinct (e.g. non-overlapping) sets of training images.

The localizer and adversarial networks may be the only two classifier neural networks in the model. This may make the model faster to train compared with models that require three of more classifier models to be trained.

The pixels identified by the localizer network may correspond to one or more regions that are discriminative for the target object. They may be pixels that are relatively more discriminative, for the localizer network, than any other pixels of the image. They may be determined from an attention map (i.e. class activation map) for the localizer network. They may be determined from a global average pooling layer and a fully connected layer of the localizer network. They may be identified by applying a hard or soft threshold to attention-map data obtained from the localizer network. The attention-map data may comprise values representative of how relatively discriminative respective pixels of the training image are for the target object.

Attenuating or erasing the identified pixels may comprise reducing a pixel value of each identified pixels. It may comprise reducing each pixel value to zero (i.e. erasing the pixels). However, in some embodiments, it comprises attenuating the pixels using a differentiable operation—e.g. by applying a soft thresholding function to attention-map data. This can enable gradients still to be back-propagated.

The localizer network is preferably trained to classify the target object. Training the localizer network may therefore comprise inputting a set of training images to the localizer network, the set comprising one or more training images that contain the target object and one or more training images that do not contain the target object. It may comprise, for each training image of the set, using the localizer network to determine a likelihood of the respective training image containing the target object, and updating the localizer network using a loss function that is a monotonically-decreasing function of the determined likelihood when the training image contains the target object, and that is a monotonically-increasing function of the determined likelihood when the training image does not contain the target object. This loss function may be the same loss function as disclosed above. It may comprise a first loss term relating to the likelihood determined by the adversarial network and a second loss term for correctly classifying the target object. The first network may be trained to classify the target object using the first training image.

The localizer and adversarial networks are preferably image-level classifier networks. The model is preferably trained using training data that comprises training images and associated image-level labels. The model is preferably an end-to-end model. The adversarial network is preferably trained using backpropagation, independently of the localizer network. The localizer network is preferably trained using backpropagation, independently of the adversarial network.

The localizer network is preferably trained to favour identifying smaller sets of discriminative pixels. This can help prevent the localizer from favouring a trivial solution in which it identifies the entire image as discriminative. Training the localizer network may therefore comprise updating weights of the localizer network using a loss function that is a function of the identified pixels for a training image—e.g. that is a function of the number of identified pixels. This loss function may increase monotonically with the number of identified pixels. When the pixels are identified by thresholding attention-map data, this loss function may be a function of the attention-map data output by the localizer network. The loss function may penalise attention maps that have high average or total values across some or all of the image. It may be a monotonically-increasing function of the sum of the pixel values over the whole (or over part) of an attention map for a training image.

Training the localizer network to classify the target object and/or to favour identifying smaller sets of discriminative pixels and/or to reduce the success of the adversarial network may be performed during a single weight updating operation using a single localizer loss function. The same first training image, containing the target object, may be used in the updating operation.

Thus, the localizer network may be trained using a localizer loss function that is, as well as being a monotonically-increasing function of the likelihood, determined by the adversarial network, of the first modified training image containing the target object:

- a monotonically-decreasing function of the likelihood, determined by the localizer network, of the first training image containing the target object; and/or
- a monotonically-increasing function of the number of pixels identified by the localizer network, or of the sum of values in all or part of an attention map generated by the localizer network for the first training image.

The first and/or second training image may contain more than one target object, which may be in different classes. The first and second classifier networks may be trained to classify a plurality of target object types (i.e. classes). Each target object may be a solid object (e.g. "bicycle") or it could be any other entity (e.g. "sky" or "purple"). An image may contain a target object even when it contains only part of the real-world object (e.g. half of a person)

The training may be implemented by training logic in the software or computer processing system. The training of any of the neural networks may comprise a gradient descent process. The model may be trained on a plurality of training images, which may comprise one hundred, one thousand, ten thousand, or more, images.

In some embodiments, each training image may be a photographic image from a camera—e.g. one frame from a video stream. It may be an image of a street scene.

The model may have a training mode and a trained (inference) mode. The training may take place during a training phase. After the training phase, the model may be configured to receive an input image (or an uncalibrated predicted label distribution for an input image) and to segment the input image. In some embodiments, weights may be extracted from the trained first localizer neural network and used to create a model for semantic image segmentation. This may be a standalone inference model that comprises the first classifier neural network but that does not include the second classifier neural network or any training logic. The trained model may be configured to output a segmentation map for an input image. It may generate the segmentation map by operating the first network to identify respective pixels of the input image (e.g. from activation maps) that are discriminative for each of a set of target object. It may combine a plurality of activation maps or thresholded pixel masks to generate the segmentation map.

The computer processing system may comprise an input for receiving image data from a camera. It may be an in-vehicle computer processing system. It may be configured to output segmentation data—e.g., to an autonomous driving system.

The training images, modified training images, inference input images, and activation maps, may be represented and encoded in any appropriate ways. They may be rescaled between operations. Data, including training data, may be stored in and accessed from a database or other data retrieval system. Weights for the neural networks may be stored as values in digital memory.

The methods disclosed herein may be fully or wholly computer-implemented methods. The computer software disclosed herein may be on a transitory or a non-transitory computer-readable medium. The model could be implemented on one or more further computer processing systems that are distinct from the computer processing system that is configured to train the model—e.g. with the systems being arranged to communicate over a physical interface. However, in other embodiments, the computer processing system is also configured to implement the first network and/or the second network.

The first and second classifier neural networks may each comprise any number of convolution layers, dense blocks, and other processing layers. The model logic and/or training logic may comprise software instructions for one or more processors, or may comprise dedicated hardware logic, or may be implemented using a combination of software and application-specific hardware. The software may comprise instructions that are stored in a memory of the computer processing system. The computer processing system may comprise one or more of: CPUs, DSPs, CPUs, FPGAs, ASICs, volatile memory, non-volatile memory, inputs, outputs, displays, network connections, power supplies, radios, clocks, and any other appropriate components. It may comprise one or more servers or supercomputers. It may comprise a microcontroller or system-on-chip (e.g. when implementing a trained model for inference operation). It may be configured to store or display or output a segmentation map or other segmentation data.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which:

FIGS. 6A and 6B are tables showing per-class comparisons with image-level supervision.

DETAILED DESCRIPTION

Semantic segmentation is the task of predicting a pixel-wise class label $y \in \{1, \ldots, K\}^{H'' \times W}$ for an input image $x \in$ $\mathbb{R}^{H \times W \times C}$ of height H, width W, and colour-space C. In some use cases, such as in self-driving vehicles, the image x may be a red-green-blue (RGB) image or video frame of a street scene, and the K classes could include "road", "sidewalk", "building", "wall", "person", "car", etc.

Described here is an exemplary end-to-end adversarial erasing model, embodying the invention. It will be given the abbreviation "EADER" for convenience.

In weakly-supervised semantic segmentation (WSSS), models are trained not on images annotated by a human with pixel-level class labels, but using training data that is labelled using bounding boxes, scribbles, points, or image-level labels. The methods described below train a model using image-level labels, which reduces the labelling effort the most. This is typically the hardest form of WSSS training. The methods could disclosed herein could be adapted to support other, easier types of WSSS training in variant embodiments.

First, we present a novel adversarial model for weakly-supervised semantic segmentation, then we illustrate the effectiveness of the method by showing how end-to-end adversarial erasing can be integrated into a conventional weakly supervised semantic segmentation framework, and providing experimental test results.

End-to-End Adversarial Erasing ("EADER")

Figure 1:
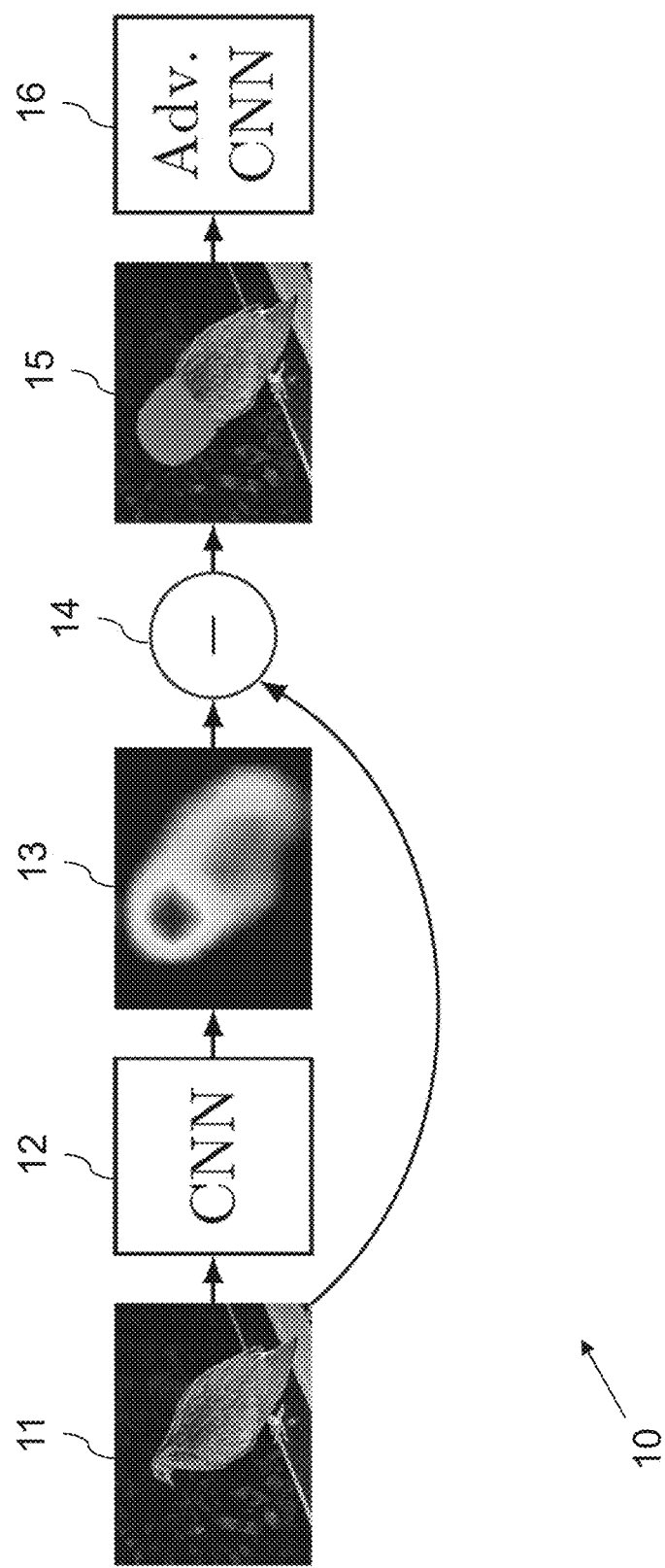
FIG. 1 is a high-level schematic diagram of a convolutional neural network (CNN) model embodying the invention.

FIG. 1 presents a high-level overview of the exemplary end-to-end adversarial model 10.

The model 10 uses two image classifiers: a first image classifier network 12, and a second, adversarial image classifier network 16. Each can be instantiated by any appropriate convolutional neural network (CNN).

The first image classifier network 12 receives input images 11 and is trained to localize a target object (in this example, a bird) using attention maps 13. It will therefore be referred to herein as a "localizer" network. The attention maps 13 are used to create new, modified images 15 in which the most discriminative object regions of the input images 11 are erased through a pixel-attenuating operation 14. These modified images 15 are then forwarded through the second network 16, which will be referred to as the "adversarial" classifier network. Its goal is to classify the images 15 correctly, even when the target classes are erased.

The image classifiers of the localizer 12 and adversarial 16 networks are optimized using binary cross-entropy loss, but in an alternating fashion using distinct optimizers. To force the localizer network 12 to not only classify the image 11 correctly, but also to spread its attention to less discriminative object regions, the localizer 12 is trained with an objective function that includes an adversarial loss term. This term captures the ability of the adversarial network 16 to still classify the erased object. The localizer 12 is regularized using an additional regularization loss term to prevent it finding a trivial solution in which it identifies the entire image 11 as discriminative, so that the entire image is then hidden from the adversarial network 16. This regularization limits the attention of the localizer 12 and forces it to erase only regions that belong to the target class.

Figure 2:
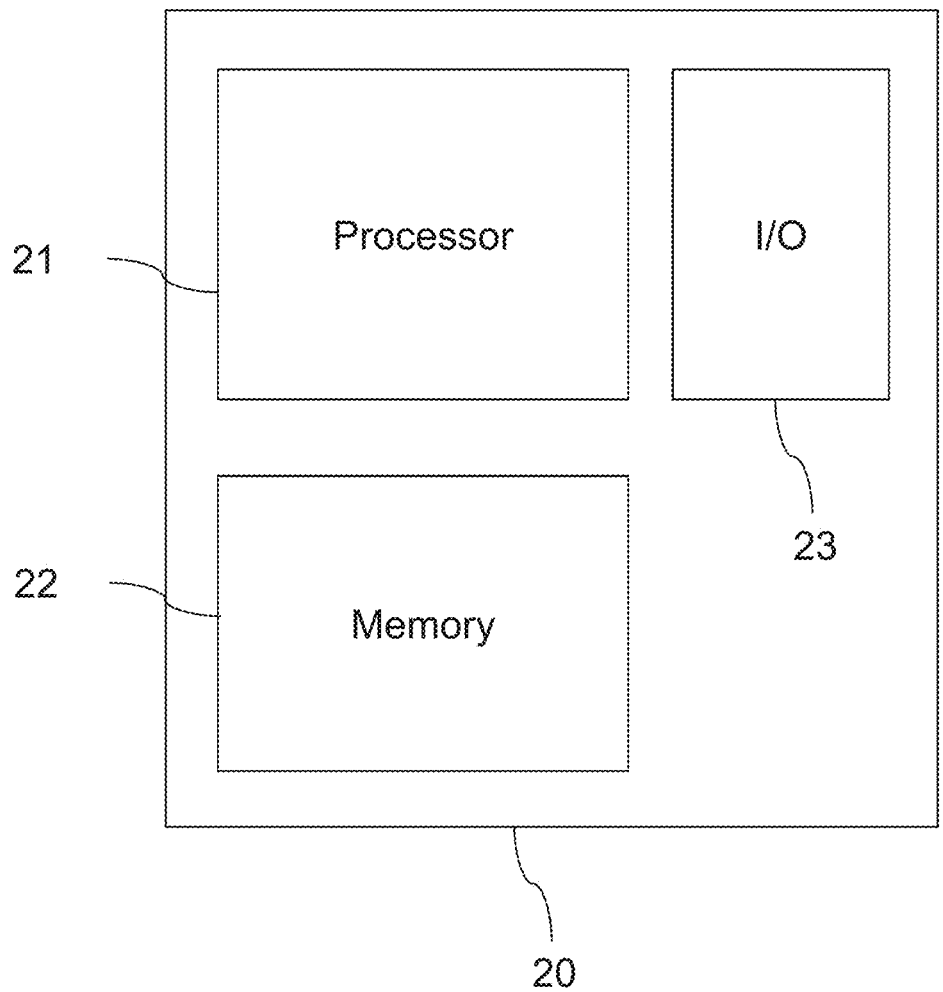
FIG. 2 is a schematic diagram of a computer system, embodying the invention, that implements the model.

FIG. 2 shows an exemplary computer processing system 20 on which the model 10 may be implemented. It comprises a processor 21 (e.g. an Intel™ processor) arranged to executed software stored in a memory 22. The processor 21 also uses the memory 22 for reading and writing data, such as input data, intermediate calculation results, and output data. Software may control the processor 21 to implement any of the methods or steps disclosed herein. In particular, the memory 22 may store training software for training the model 10, which may include instructions for providing input to, and receiving output from, the localizer and adversarial networks 12, 16, and for implementing the pixel—attenuating operation 14. The computer 20 has input/output peripherals 23—e.g. for receiving training data and/or for exporting data encoding the trained network.

Once a training of the model 10 has been completed, the localizer network 12 can be used in an inference mode for classifying images. It may be used without the adversarial network 16. The localizer network 12 may be replicated and installed on further computer systems, similar to the system 20. It may be installed in devices such as within a control or warning system for an autonomous vehicle. It may be trained to classify objects in a street scene, and may be used in inference mode to classify object in images captures by one or more cameras mounted in a vehicle. However, it is not limited to such applications.

Figure 3:
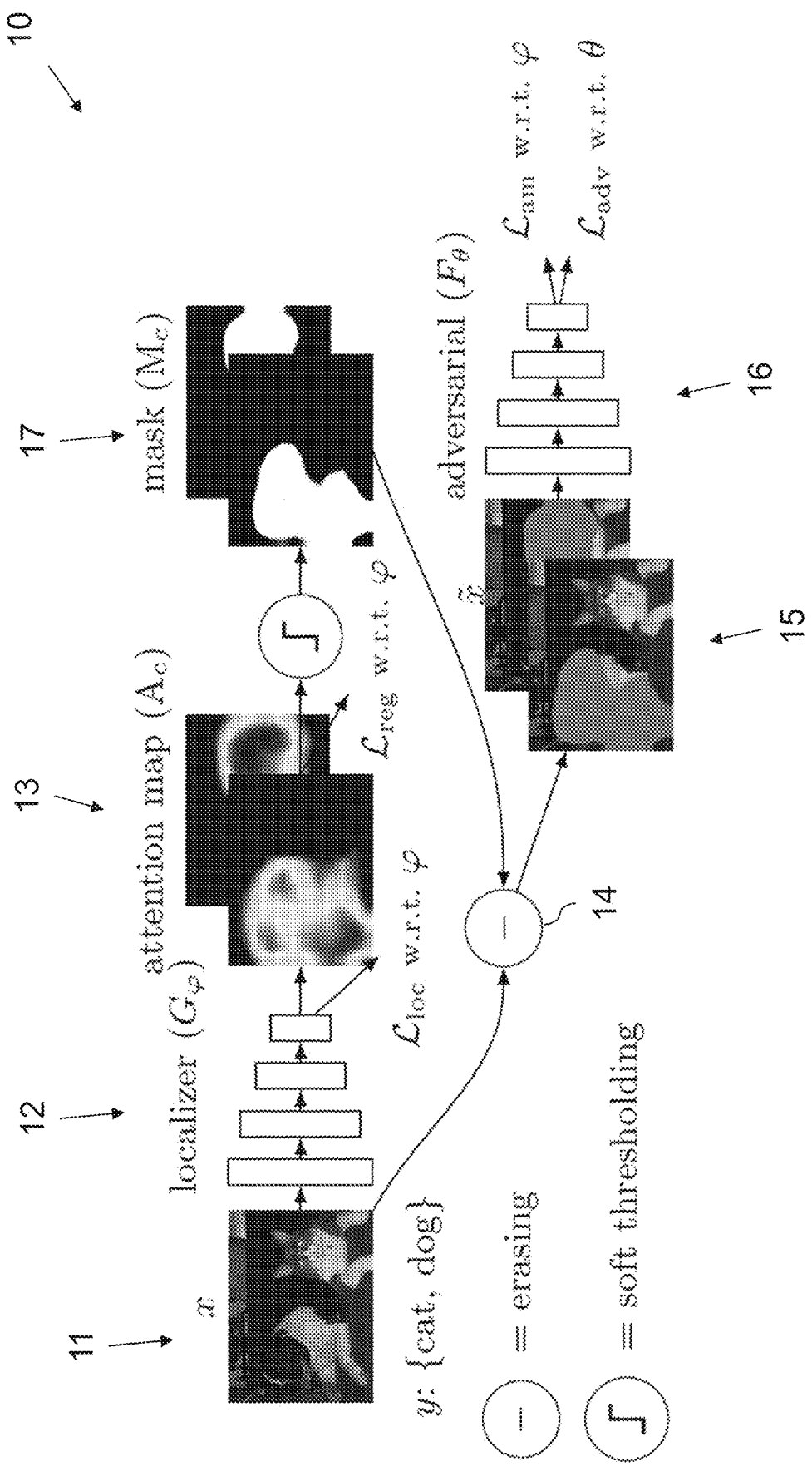
FIG. 3 is a more-detailed schematic diagram of the model.

FIG. 3 shows the end-to-end adversarial erasing framework 10 in more detail.

The example training input image x 11 in FIG. 2 is a photo containing both a dog and a cat, and it has therefore been labelled with the image-level class labels y={cat, dog}. Other training images may contain just a dog or just a cat (or any other target objects) and be labelled accordingly. During training, an input image x is forwarded through the localizer network $G_\varphi$ 12 to extract a respective attention map $A_c$ 13 for each class, c, of target object. Using a soft-thresholding operation, each attention map 13 is converted to a respective binary masks $M_c$ 17 in which the pixels of the most discriminative object parts for the respective target object (i.e. class) are "1" and all other pixels are "0". An image subtraction module 14 creates a respective modified image $\tilde{x}$ 15 from each mask 17, by erasing or attenuating the most discriminative pixels from the input image x. The modified images 15 are forwarded through the adversarial network $F_\theta$ 16. The localizer 12 is optimized using both a classification loss $\mathcal{L}_{loc}$ and an adversarial loss term $\mathcal{L}_{am}$. These two terms force the localizer 12 to spread its attention to less discriminative object parts, while a further regularizing $\mathcal{L}_{reg}$ loss term encourages the localizer model 12 to bound the activation to the minimum necessary area.

The adversarial network $F_\theta$ 16 is optimized using a classification loss $\mathcal{L}_{adv}$. The adversarial network $F_\theta$ 16 and the localizer network $G_\varphi$ 12 may be trained iteratively, in alternating steps. A common data set is here used to train both networks 12, 16.

Consider a dataset $\mathcal{D} = \{x_i, y_i\}_{i=1}^N$, where N is the number of images, $x_i$ the input image and $y_i$ a multi-hot vector of length C, with C being the number of classes, and in which $y_{i,c}=1$, if class c is present in $x_i$, and in which $y_{i,c}=0$ if not. Note that being in a multi-label setup, multiple classes can be present in an input image and hence $\Sigma_c y_{i,c} \geq 1$.

Localizer network. The localizer 12 can be instantiated by any convolutional neural network from which class activation mappings (CAMs) or gradient-weighted class activation mappings (Grad-CAMs) can be extracted. Class activation mappings highlight relevant regions of an image and can be obtained by using a global average pooling layer and a fully connected layer for classification. For simplicity, the usage of CAMs is assumed in the following explanation, but the same approach can be extended to more advanced attention extraction methods such as Grad-CAM.

The localizer G 12 has trainable parameters φ and is trained as a multi-label classifier using binary cross-entropy loss on each label class, c, for C different classes, to minimize the loss term:

$$\mathcal{L}_{loc}(G_\varphi(x_i), y_i) = -\frac{1}{C}\sum_c y_{i,c} \ln(G_\varphi(x_i)) + (1 - y_{i,c}) \ln(1 - G_\varphi(x_i)) \quad (1)$$

Attention maps. Given a trained, or part-trained, localizer network $G_\varphi$ 12, the attention map $A_c$ for class c can be obtained using the feature map of the final convolutional layer $g_\varphi^{final}$ and the classification weights $w_c$ as follows:

$$A_c(x_i) = \text{ReLU}(w_c^T g_\varphi^{final}(x_i)). \quad (2)$$

$A_c$ is then normalized so that the maximum activation equals 1.

Soft masks. Only the attention maps for ground-truth classes are kept (i.e. for classes that are actually present in the input images 11). These attention maps 13 are then resized to have the same pixel dimensions as the input image 11, and a soft thresholding operation is applied to generate class-specific masks 17 for input images $x_i$:

$$M_c(x_i) = \sigma(\omega(A_c(x_i) - \psi)), \quad (3)$$

where $\sigma$ is the sigmoid nonlinearity, $\psi$ is the threshold value, and w is a scaling parameter that ensures that values above the threshold are close to 1 and values below are close to 0. In contrast to a regular thresholding operation, this soft threshold is differentiable which allows the gradients from any further computations to back-propagate to the localizer 12. Adjustable parameters such as $\psi$ may be set by performing a hyperparameter optimization process on a validation set.

Erasing. Input images $\tilde{x}_i$ 15 for the adversarial network 16 are created by the pixel-attenuating module 14 as follows:

$$\tilde{x}_{i,c} = x_i \odot (1 - M_c(x_i)) \quad (4)$$

where $\odot$ denotes element-wise multiplication.

Note that only the attention map 13 of one particular class is erased in any particular modified image 15, so multiple images 15 are created in cases where there is more than one target class, c.

Adversarial network. The adversarial network F 16 has trainable parameters $\theta$ and is trained as a multi-label classifier using a binary cross-entropy loss function:

$$\mathcal{L}_{adv}(F_\theta(\tilde{x}_i), y_i) = -\frac{1}{C}\sum_c y_{i,c} \ln b(F_\theta(\tilde{x}_{i,c})) + (1 - y_{i,c}) \ln(1 - F_\theta(\tilde{x}_{i,c})) \quad (5)$$

This is the same as the classifier loss term $\mathcal{L}_{loc}$ in Equation (1) that is used to train the localizer network 12, although applied to the modified images $\tilde{x}$.

Hence, the goal of this adversarial classifier network 16 is to classify the same targets as before, despite the erased evidence.

Attention mining loss. To encourage the localizer network 12 to erase the target object evidence thoroughly, we engage the localizer network 12 in an adversarial game with the adversarial model 16.

The loss function for the localizer 12 therefore also includes an adversarial loss term, which encourages it to learn to force the adversarial network 16 into misclassifying the modified images. As an adversarial loss term, this embodiment utilizes attention-mining loss, which is the mean of the logits of the classes that have been erased:

$$\mathcal{L}_{am}(\tilde{x}_{i,c}, y_i) = \frac{1}{C}\sum_{x \in y_i} F_\theta(\tilde{x}_{i,c}) \quad (6)$$

Regularization loss. To regularize the localizer 12, to prevent it from learning the trivial solution where it erases the entire image to globally minimize the attention mining loss, we impose an additional regularization loss term:

$$\mathcal{L}_{reg}(x_i, y_i) = \frac{1}{W \times H \times C}\sum_{c \in y_i}\sum_{j,k} A_c(x_i)_{j,k}, \quad (7)$$

where W and H represent the width and height of the activations.

Incorporating this regularization loss term in the optimization process encourages the localizer 12 to find a minimum attention map that covers the target class.

Total loss. The total loss function used when training the localizer 12 is therefore:

$$\mathcal{L}_{total} = \mathcal{L}_{loc} + \alpha \mathcal{L}_{am} + \beta \mathcal{L}_{reg}. \quad (8)$$

where $\alpha$ and $\beta$ are hyper-parameters that can be adjusted to tune the importance of the adversarial and regularization losses respectively—e.g. based on results of empirical testing.

The localizer 12 is trained to minimize the adversarial loss term, $\mathcal{L}_{am}$, while the adversarial model 16 tries to maximize it, by being trained to minimize the loss function $\mathcal{L}_{adv}$ in Equation (5).

Segmentation maps. After the computer system 20 trains the model 10 with the described loss terms, the localizer network 12 can be used in an inference mode by converting attention maps 13 to segmentation maps. This may be done by the same computer system 20, or by copying the localizer 12 and implementing it on one or more inference systems. The attention maps are up-sampled to the image resolution and stacked together, using C+1 channels. Since the classification model 10 is not trained for a background class, the first channel is set to a threshold value p. Segmentation masks can then be obtained by taking the argmax over the class dimension. These segmentation masks may be further processed as appropriate—e.g., when used in a vehicle, to detect a potential collision with a pedestrian and to sound an alarm and/or take evasive driving action in response.

Experimental Results

Setup

Model. The methods described here can be integrated into other systems. This was demonstrated by an integration of the above-described end-to-end adversarial erasing (EADER) scheme into an existing WSSS method known as Pixel-level Semantic Affinity (PSA), e.g. as described in Ahn et al. [Ahn, J., Kwak, S.: *Learning pixel-level semantic affinity with image-level supervision for weakly supervised semantic segmentation*. In: Proceedings of the IEEE Conference on Computer Vision and Pattern Recognition. (2018) 4981-4990].

PSA consists of three stages. The first stage trains a classification network to generate CAMs. However, this stage suffers from a "discriminative localization" problem in which it learns to focus on only the most discriminative object regions. In this stage there are no specific methods utilized to improve the segmentation masks, but extensive training and test-time data augmentations are utilized. The segmentation masks generated from CAMs are used to generate two sets of labels for the second stage. The first set are labels with high confidence for the background regions, while the second set is with high confidence for the object regions. In the second stage the semantic affinities are learned using AffinityNet, which propagates local responses in the maps to nearby regions which belong to the same semantic entity. The two distinct sets allow reliable training of AffinityNet, as regions of low confidence are discarded. The AffinityNet output predictions are used as pseudo-labels in the last stage, where a fully-supervised semantic segmentation network is trained with it.

The CAM-generation stage of PSA is suitable for adversarial training using the methods disclosed herein as it suffers from discriminative localization, and because the classification network is suitable for use as a localizer network. In particular, it is suitable because the CAMs are generated from the final convolutional layer without the need of any post-processing or other gradient-breaking computations.

In experimental testing, a PSA implementation was used as a localizer network 12, and a soft threshold, as described above, was applied to attention maps 13 generated using the PSA to create masks 17, which were used to erase the most discriminative object regions from the input images 11. The resulting images 15 were forwarded through an adversarial network 16, as described above, with an attention mining loss $\mathcal{L}_{am}$ being applied as an adversarial loss on the PSA localizer network 12.

Dataset. We evaluated the performance of the methods described herein on the Pascal VOC 2012 segmentation dataset, which is a widely used benchmark for weakly supervised semantic segmentation. The dataset consists of twenty object classes and one background class and contains 1464, 1449 and 1456 images in the train, validation and test sets respectively. We augmented the dataset with annotations from Hariharan et al. [Hariharan, B., Arbelaez, P., Bourdev, L., Maji, S., Malik, J.: *Semantic contours from inverse detectors*. In: International Conference on Computer Vision (ICCV). (2011)], resulting in a total of 10582 training images. We determined the mean intersection-overunion (mIoU) for the validation and test sets. The test set results were obtained using the official Pascal VOC evaluation server.

No post-processing was employed and the method did not employ tricks such as test-time augmentations, post-processing and saliency cues to the method we integrated with.

Network architecture details. We tested the adversarial training approach with a ResNet-101 localizer network, while the adversarial network was a ResNet-18 network. We utilized ImageNet pre-trained weights for the both networks. When integrating with PSA, to ensure fair comparisons, we did not change any of the existing networks, which means the localizer was a WideResNet with 38 convolutional layers, while the adversarial model was kept as a ResNet-18. In the final stage we trained a fully-supervised semantic segmentation network on proxy labels. We utilized the segmentation model DeepLabV3+, with ResNet-101 and Xception-65 backbones and the default training strategy.

Training specifications. We trained the localizer with a batch size of 16, while the batch size was dynamic for the adversarial model as it depends on the number of objects in each image. For example, when each image in the batch of 16 has two object categories, both objects are erased from each image separately and the batch size for the adversarial network will be 32. We randomly resized and cropped the input images into 448×448 for both the localizer and the adversarial model. Both networks were optimized for ten epochs with stochastic gradient descent with a learning rate of 0.01. We alternatively trained the localizer and adversarial per 200 training steps.

Throughout the experiments, unless specified otherwise, the values of $\alpha$ and $\beta$ in Equation (8) were set to $\alpha$=0.05 and $\beta$=10$^{-5}$. Further hyperparameter values were $\omega$=100, $\psi$=0.5 in Equation (3), and $\rho$=0.3 as a first-channel threshold. We followed the training settings of Ahn et al. when training PSA and use an initial learning rate of for the adversarial network. To generate attention maps we utilized Grad-CAM [Selvaraju, R. R., Cogswell, M., Das, A., Vedantam, R., Parikh, D., Batra, D.: Gradcam: *Visual explanations from deep networks via gradient-based localization*. In: Proceedings of the IEEE International Conference on Computer Vision. (2017) 618-626] in our experiments, while we used CAM [Zhou, B., Khosla, A., Lapedriza, A., Oliva, A., Torralba, A.: *Learning deep features for discriminative localization*. In: Proceedings of the IEEE conference on computer vision and pattern recognition. (2016) 2921-2929] when integrating into PSA, to keep the comparison fair.

Ablation Study

Our first experiment was an ablation study to verify that the adversarial network forces the localizer network to spread its attention to less discriminative object regions.

Recall from Equation (8) that $\alpha$ controls the strength of the adversarial loss term. The following table show the results of varying the $\alpha$ parameter on the Pascal VOC 2012 validation set, and reporting the mIoU, precision and recall of the segmentation masks. We report both the mean and standard deviation over six runs.

| $\alpha$ | mIoU | Precision | Recall |
| --- | --- | --- | --- |
| 0 | 41.37 ± 0.26 | 58.26 ± 0.50 | 58.18 ± 0.66 |
| 0.01 | 42.51 ± 0.41 | 57.79 ± 0.72 | 60.88 ± 0.52 |
| 0.05 | 43.89 ± 0.40 | 54.78 ± 1.03 | 68.13 ± 1.51 |
| 0.1 | 42.88 ± 0.99 | 52.68 ± 2.30 | 69.31 ± 1.84 |

Figure 4:
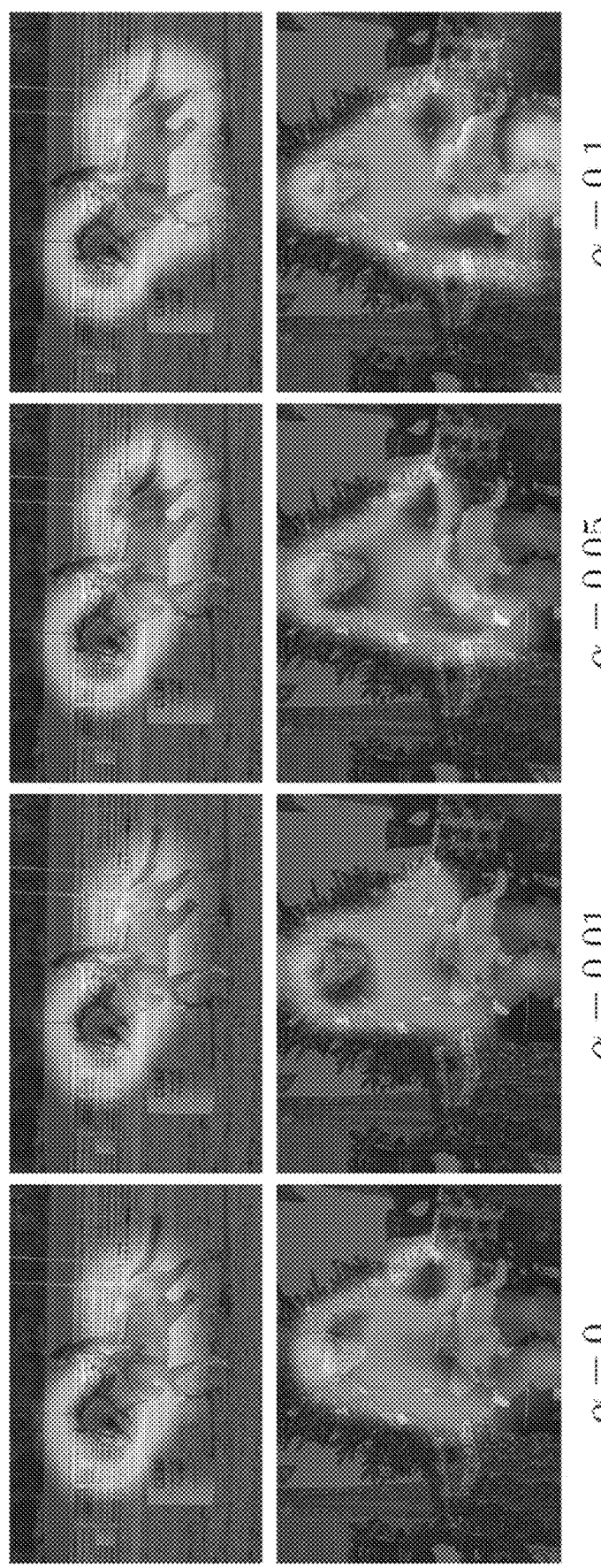
FIG. 4 is a table of attention maps, generated by a model embodying the invention, for two example input images, for four different adversarial loss terms.

FIG. 4 shows examples of attention maps generated for input images, obtained using Grad-CAMs from a novel end-to-end adversarial erasing (EADER) method described herein, using different values for the adversarial loss term $\alpha$. The top row shows attention maps for an image of a person riding a horse, for the class "horse". The bottom row shows attention maps for an image of a person stroking a cat, for the class "person", As the $\alpha$ value increases, it can be seen that attention spreads to less discriminative object regions.

Comparison to PSA

We now compare the original PSA results to the results where we have integrated end-to-end adversarial erasing ("EADER") as disclosed herein.

The following table shows the improvements in terms of mIoU as a comparison to our baseline, the Pixel-level Semantic Affinity (PSA) method on the Pascal VOC 2012 validation set. To enable a fair comparison we reproduced the PSA numbers and trained the proxy labels from AffinityNet on DeepLabV3+. The numbers with a † denote our reproduced results.

| Model | CAM | | | AffinityNet | DeepLabV3+ |
| | mIoU | Precision | Recall | mIoU | mIoU |
| --- | --- | --- | --- | --- | --- |
| PSA | 46.8 | 60.3† | 66.7† | 58.7 | 60.7† |
| PSA w/EADER | 48.6 | 61.3 | 68.7 | 60.1 | 62.8 |

Additionally, we reported precision and recall after the CAM generation stage.

End-to-end adversarial erasing (EADER) improves performance in this stage for all metrics. In other words, the combination of the adversarial and regularization loss terms forces the attention map to spread to less discriminative object regions without spreading to background areas. Besides, the mIoU scores in this stage are higher than those reported in the first table above, which is caused by the extensive test-time augmentations used by PSA.

In the next stage, training AffinityNet with the improved outputs of the first stage again resulted in better mIoU scores. Finally, we report results when training a fully-supervised semantic segmentation model on the proxy labels generated by AffinityNet. As we utilized DeepLabV3+ instead of ResNet-38 as a fully-supervised semantic segmentation model, we also report the results of DeepLabV3+ trained on proxy labels without end-to-end adversarial erasing. Again, this results in improvements in terms of mIoU, proving the integrability of end-to-end adversarial erasing into existing WSSS methods.

Each of FIGS. 6A and 6B show a per-class comparison on the validation and test sets.

FIG. 6A shows a per-class comparison with Pixel-level Semantic Affinity (PSA) on the Pascal VOC 2012 validation set with only image-level supervision:

FIG. 6B shows a per-class comparison with Pixel-level Semantic Affinity (PSA) on the Pascal VOC 2012 test set with only image-level supervision:

Note that in FIG. 6B, the more powerful WideResNet-38 was used by the PSA method as the final fully-supervised segmentation model instead of DeepLabV3+.

The discriminative localization problem is especially prevalent in non-rigid object classes. We found that end-to-end adversarial erasing (EADER) significantly improves the results in many non-rigid object classes such as bird, cat, cow and horse. Typically in these object classes the most discriminative object region is the head or the feet, which causes the attention map to cover only a small portion of these object classes. With end-to-end adversarial erasing, the localizer is forced to capture the entire object region, as the fur or skin of these object classes are less discriminative, but still recognizable. For outdoor object classes the results are often similar to PSA, while for indoor object classes the performance is often degraded. Overall, end-to-end adversarial erasing increases the performance, even though it makes use of a less powerful fully-supervised segmentation model.

Figure 5:
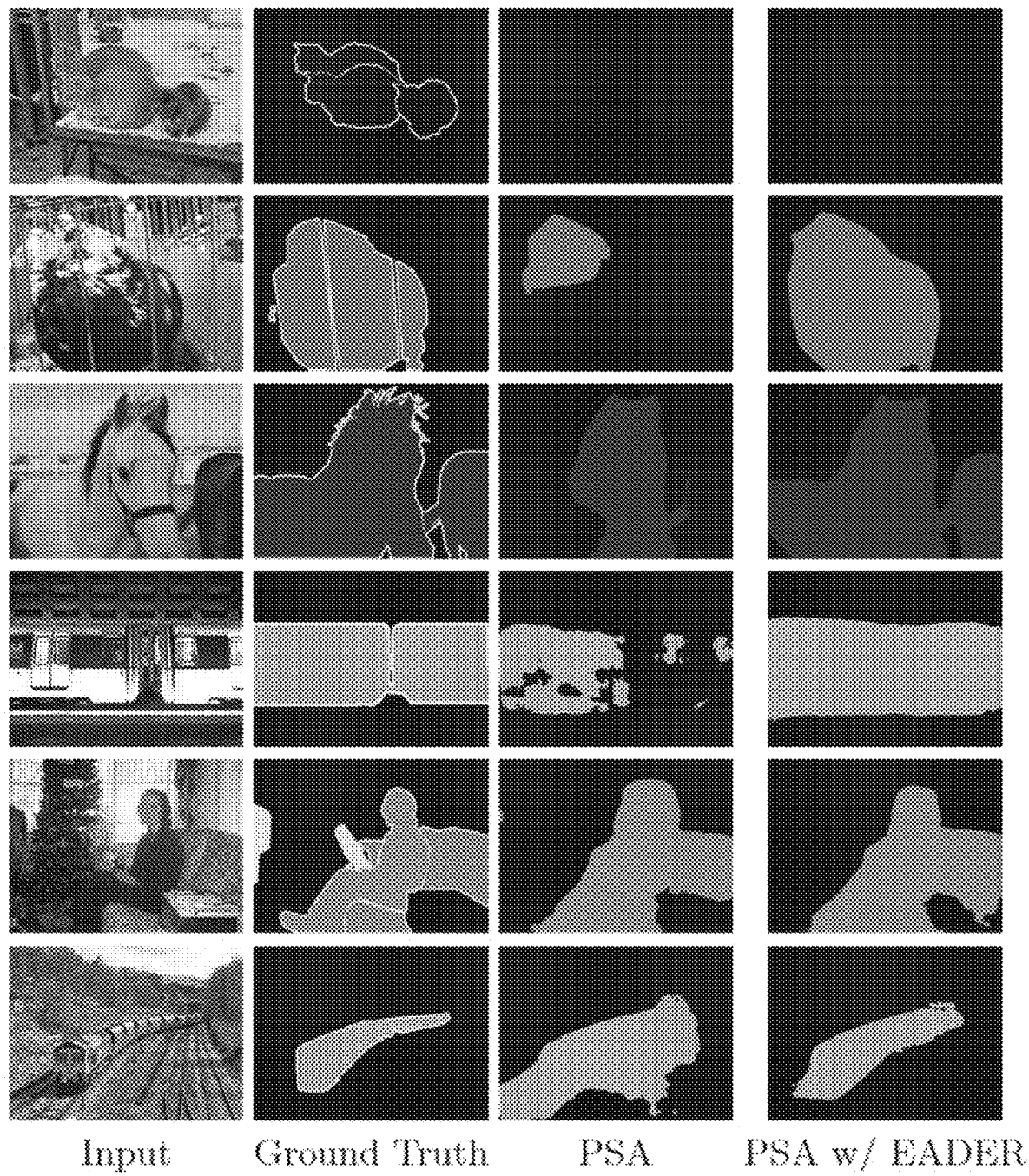
FIG. 5 is a table of six input images, with corresponding ground truth labels, segmentation maps generated by a conventional approach, and segmentation maps generated by a model embodying the invention.

FIG. 5 shows some qualitative results on the Pascal VOC 2012 validation set. The white edges in the ground-truth mask denote pixels that are ignored during evaluation. These images demonstrate the increase in precision, recall and mIoU. The first four rows, for input images containing a pair of cats, a bird, a horse and a train, respectively, show that end-to-end adversarial erasing (EADER) better segments objects by capturing less discriminative object regions, including for non-rigid object classes (i.e. correctly identifying more pixels of the target object class than conventional PSA does). The last two rows, for images containing a person and a train, respectively, show increased specificity (i.e. fewer pixels outside the target object that a falsely classified as belonging to the target class), which can be attributed to the regularization term that forces the attention to spread only to areas where the localizer is confident that it is an object region.

Comparison to Adversarial Erasing Methods

The following table compares our results to known WSSS methods that follow an adversarial erasing strategy, on the Pascal VOC 2012 dataset. For supervision, $\mathcal{I}$ denotes image-level labels and S denotes saliency masks. It shows that EADER outperforms all existing adversarial erasing methods, even when most of them use stronger supervision signals in the form of saliency masks. When comparing to ACoL, the only other adversarial erasing methodology without saliency masks, we significantly outperform their number on the validation set.

| Method | Supervision | Validation | Test |
| --- | --- | --- | --- |
| AE-PSL | $\mathcal{I}$ + S | 55.0 | 55.7 |
| GAIN | $\mathcal{I}$ + S | 55.3 | 56.8 |
| SeeNet | $\mathcal{I}$ + S | 63.1 | 62.8 |
| ACoL | $\mathcal{I}$ | 56.1† | — |
| EADER (Ours) | $\mathcal{I}$ | 62.8 | 63.8 |

AE-PSL is described in [Wei, Y., Feng, J., Liang, X., Cheng, M. M., Zhao, Y., Yan, S.: Object region mining with adversarial erasing: A simple classification to semantic segmentation approach. In: Proceedings of the IEEE conference on computer vision and pattern recognition. (2017) 1568-1576]

GAIN is described in [Li, K., Wu, Z., Peng, K. C., Ernst, J., Fu, Y.: Tell me where to look: Guided attention inference network. In: Proceedings of the IEEE Conference on Computer Vision and Pattern Recognition. (2018) 9215-9223]

SeeNet is described in [Hou, Q., Jiang, P., Wei, Y., Cheng, M. M.: Self-erasing network for integral object attention. In: Advances in Neural Information Processing Systems. (2018) 549-559]. The result marked t was also obtained from here.

ACoL is described in [Zhang, X., Wei, Y., Feng, J., Yang, Y., Huang, T. S.: Adversarial complementary learning for weakly supervised object localization. In: Proceedings of the IEEE Conference on Computer Vision and Pattern Recognition. (2018) 1325-1334]

Comparison to the State-of-the-Art

The following table compares EADER to known WSSS methods, on the Pascal VOC 2012 dataset. It shows the feature extractor that is used to generate object locations, the fully supervised model that is trained on proxy labels (where applicable), and the form of supervision. The methods denoted with supervision signal F denote the upper bound of the segmentation performance. Note that our method outperforms a fully supervised FCN network and we achieved ≈73% of the upper bound, set by a fully supervised DeepLabV3+ model. Further, it shows that EADER attained competitive performance with other models that use only image-level labels ($\mathcal{I}$).

For the supervision, $\mathcal{I}$ denotes image-level labels, S denotes saliency masks, and F denotes pixel-level labels, which is the upper bound for fully supervised semantic segmentation. For the feature extractor, the mentioned architecture is the one that is used to generate the initial object locations (e.g. by utilizing CAMs):

| Method | Feature Extractor | Fully Supervised Model (Backbone) | Supervision | Validation | Test |
|---|---|---|---|---|---|
| FCN | — | (VGG16) | $\mathcal{F}$ | — | 62.2 |
| WideResNet-38 | — | (WideResNet-38) | $\mathcal{F}$ | 80.8 | 82.5 |
| DeepLabV3+ | — | (Xception-65) | $\mathcal{F}$ | 84.6 | 87.8 |
| AE-PSL | VGG-16 | DeepLab (VGG-16) | $\mathcal{I}$ + S | 55.0 | 55.7 |
| GAIN | VGG-16 | DeepLab (VGG-16) | $\mathcal{I}$ + S | 56.3 | 56.8 |
| SeeNet | VGG-16 | DeepLab (VGG-16) | $\mathcal{I}$ + S | 61.1 | 60.7 |
| FickleNet | VGG-16 | DeepLab (VGG-16) | $\mathcal{I}$ + S | 61.2 | 61.9 |
| Fan et al. | ResNet-50 | DeepLab (VGG-16) | $\mathcal{I}$ + S | 61.3 | 62.1 |
| SeeNet | VGG-16 | DeepLab (ResNet-101) | $\mathcal{I}$ + S | 63.1 | 62.8 |
| OAA+ | VGG-16 | DeepLab (VGG-16) | $\mathcal{I}$ + S | 63.1 | 62.8 |
| Fan et al. | ResNet-50 | DeepLab (ResNet-101) | $\mathcal{I}$ + S | 63.6 | 64.5 |
| FickleNet | VGG-16 | DeepLab (ResNet-101) | $\mathcal{I}$ + S | 64.9 | 65.3 |
| OAA+ | VGG-16 | DeepLab (ResNet-101) | $\mathcal{I}$ + S | 65.6 | 66.4 |
| EM-Adapt | VGG-16 | — | $\mathcal{I}$ | 38.2 | 39.6 |
| SEC | VGG-16 | DeepLab (VGG-16) | $\mathcal{I}$ | 50.7 | 51.7 |
| MMEF | VGG-16 | FCN (VGG-16) | $\mathcal{I}$ | — | 55.6 |
| PSA (baseline) | WideResNet-38 | DeepLab (VGG-16) | $\mathcal{I}$ | 58.4 | 60.5 |
| RRM | WideResNet-38 | DeepLab (VGG-16) | $\mathcal{I}$ | 60.7 | 61.0 |
| PSA (baseline) | WideResNet-38 | WideResNet-38 | $\mathcal{I}$ | 61.7 | 63.7 |
| Araslanov and Roth | WideResNet-38 | — | $\mathcal{I}$ | 62.7 | 64.3 |
| SSDD | WideResNet-38 | WideResNet-38 | $\mathcal{I}$ | 64.9 | 65.5 |
| RRM | WideResNet-38 | DeepLab (ResNet-101) | $\mathcal{I}$ | 66.3 | 66.5 |
| EADER (Ours) | WideResNet-38 | DeepLab (ResNet-101) | $\mathcal{I}$ | 62.5 | 63.0 |
| EADER (Ours) | WideResNet-38 | DeepLab (Xception-65) | $\mathcal{I}$ | 62.8 | 63.8 |

FCN is described in [Long, J., Shelhamer, E., Darrell, T.: Fully convolutional networks for semantic segmentation. In: Proceedings of the IEEE conference on computer vision and pattern recognition. (2015) 3431-3440]

WideResNet-38 is described in [Wu, Z., Shen, C., Van Den Hengel, A.: Wider or deeper: Revisiting the resnet model for visual recognition. Pattern Recognition 90 (2019) 119-133]

DeepLabV3+ is described in [Chen, L. C., Zhu, Y., Papandreou, G., Schroff, F., Adam, H.: Encoder-decoder with atrous separable convolution for semantic image segmentation. In: Proceedings of the European conference on computer vision (ECCV). (2018) 801-818]

FickleNet is described in [Lee, J., Kim, E., Lee, S., Lee, J., Yoon, S.: Ficklenet: Weakly and semi-supervised semantic image segmentation using stochastic inference. In: Proceedings of the IEEE conference on computer vision and pattern recognition. (2019) 5267-5276]

Fan et al. is described in [Fan, R., Hou, Q., Cheng, M. M., Yu, G., Martin, R. R., Hu, S. M.: Associating inter-image salient instances for weakly supervised semantic segmentation. In: Proceedings of the European Conference on Computer Vision (ECCV). (2018) 367-383]

OAA+ is described in [Jiang, P. T., Hou, Q., Cao, Y., Cheng, M. M., Wei, Y., Xiong, H. K.: Integral object mining via online attention accumulation. In: Proceedings of the IEEE International Conference on Computer Vision. (2019) 2070-2079]

EM-Adapt is described in [Papandreou, G., Chen, L. C., Murphy, K. P., Yuille, A. L.: Weakly- and semisupervised learning of a deep convolutional network for semantic image segmentation. In: Proceedings of the IEEE international conference on computer vision. (2015) 1742-1750]

SEC is described in [Kolesnikov, A., Lampert, C. H.: Seed, expand and constrain: Three principles for weakly-supervised image segmentation. In: European Conference on Computer Vision, Springer (2016) 695-711]

MMEF is described in [Ge, W., Yang, S., Yu, Y.: Multi-evidence filtering and fusion for multi-label classification, object detection and semantic segmentation based on weakly supervised learning. In: Proceedings of the IEEE Conference on Computer Vision and Pattern Recognition. (2018) 1277-1286]

RRM and SSDD are described in [Zhang, B., Xiao, J., Wei, Y., Sun, M., Huang, K.: Reliability does matter: An end-to-end weakly supervised semantic segmentation approach. In: The Thirty-Fourth AAAI Conference on Artificial Intelligence, AAAI 2020, The Thirty-Second Innovative Applications of Artificial Intelligence Conference, IAAI 2020, The Tenth AAAI Symposium on Educational Advances in Artificial Intelligence, EAAI 2020, New York, NY, USA, Feb. 7-12, 2020, AAAI Press (2020) 12765-12772]

Aralsanov and Roth is described in [Araslanov, N., Roth, S.: Single-stage semantic segmentation from image labels. In: Proceedings of the IEEE/CVF Conference on Computer Vision and Pattern Recognition. (2020) 4253-4262]

SSDD is described in [Shimoda, W., Yanai, K.: Self-supervised difference detection for weakly-supervised semantic segmentation. In: Proceedings of the IEEE International Conference on Computer Vision. (2019) 5208-5217]

Thus it can be seen that the novel end-to-end adversarial erasing (EADER) approach helps to address the "discriminative localization" problem which is an inherent issue in weakly-supervised semantic segmentation methods. This approach is integrable to existing methods, not requiring iterative classifiers, post-processing, weight sharing or saliency masks, unlike many previous adversarial erasing methods. It has been shown to improve performance on the Pascal VOC 2012 dataset, especially on non-rigid classes, which suffer the most from the discriminative localization problem.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. A method for training a model for use in semantic image segmentation, wherein the model comprises:
a first classifier neural network; and
a second classifier neural network,
wherein the method comprises training the first classifier neural network by:
inputting a first training image containing a target object to the first classifier neural network;
using the first classifier neural network to identify pixels of the first training image that are discriminative for the target object;
generating a first modified training image by attenuating or erasing the identified pixels of the first training image;
inputting the first modified training image to the second classifier neural network;
using the second classifier neural network to determine a likelihood of the first modified training image containing the target object; and
updating weights of the first classifier neural network using a first loss function that is a monotonically-increasing function of the determined likelihood, and wherein the method comprises training the second classifier neural network by:
inputting a second training image, containing the target object, to the first classifier neural network;
using the first classifier neural network to identify pixels of the second training image that are discriminative for the target object;
generating a second modified training image by attenuating or erasing the identified pixels of the second training image;
inputting a set of training images to the second classifier neural network, the set comprising the second modified training image and one or more training images that do not contain the target object; and
for each training image of the set, using the second classifier neural network to determine a likelihood of the respective training image containing the target object, and updating weights of the second classifier neural network using a second loss function, different from the first loss function, wherein the second loss function is a monotonically-decreasing function of the determined likelihood when the training image contains the target object, and is a monotonically-increasing function of the determined likelihood when the training image does not contain the target object.

2. The method of claim 1, wherein the first classifier neural network and the second classifier neural network are independent convolutional neural networks having independent sets of weights.

3. The method of claim 1, comprising alternately training the first classifier neural network and the second classifier neural network for a plurality of training cycles.

4. The method of claim 1, comprising:
training the first classifier neural network with the second classifier neural network operating in an inference mode;
updating the weights of the first classifier neural network without changing any weights of the second classifier neural network;
training the second classifier neural network with the first classifier neural network operating in an inference mode; and
updating the weights of the second classifier neural network without changing any weights of the first classifier neural network.

5. The method of claim 1, comprising training the first classifier neural network and the second classifier neural network on a common plurality of training images.

6. The method of claim 1, wherein the pixels of the first training image identified by the first classifier neural network are pixels that are relatively more discriminative, for the first classifier neural network, than any other pixels of the image.

7. The method of claim 1, comprising identifying the pixels of the first training image by applying a hard or soft threshold to attention-map data obtained using the first classifier neural network.

8. The method of claim 1, comprising training the first classifier neural network to classify the target object.

9. The method of claim 1, wherein the first classifier neural network and the second classifier neural network are image-level classifier networks, and wherein the model is trained using training data that comprises training images and associated image-level labels.

10. The method of claim 1, comprising training the first classifier neural network to favour identifying smaller sets of discriminative pixels by the first loss function additionally being a monotonically-increasing function of the number of pixels identified by the first classifier neural network, or of the sum of values in all or part of an attention map for the first training image generated using the first classifier neural network.

11. A non-transitory computer readable storage medium storing instructions that, when executed on a computer processing system, cause the computer processing system to perform semantic image segmentation using the first classifier neural network of a model trained by the method of claim 1.

12. A computer processing system configured to implement the first classifier neural network of a model trained by the method of claim 1, for performing semantic image segmentation.

13. The computer processing system of claim 12, wherein the computer processing system is a computer processing system for a vehicle, and comprises an input for receiving image data from a camera, and an output for outputting segmentation data to an autonomous driving system for the vehicle.

14. A computer processing system for training a model for use in semantic image segmentation,
wherein the model comprises:
a first classifier neural network; and
a second classifier neural network,
wherein the computer processing system is configured to train the first classifier neural network by:
inputting a first training image containing a target object to the first classifier neural network;
using the first classifier neural network to identify pixels of the first training image that are discriminative for the target object;
generating a first modified training image by attenuating or erasing the identified pixels of the first training image;
inputting the first modified training image to the second classifier neural network;

using the second classifier neural network to determine a likelihood of the first modified training image containing the target object; and updating weights of the first classifier neural network using a first loss function that is a monotonically-increasing function of the determined likelihood, and wherein the computer processing system is configured to train the second classifier neural network by:

inputting a second training image, containing the target object, to the first classifier neural network;

using the first classifier neural network to identify pixels of the second training image that are discriminative for the target object;

generating a second modified training image by attenuating or erasing the identified pixels of the second training image;

inputting a set of training images to the second classifier neural network, the set comprising the second modified training image and one or more training images that do not contain the target object; and for each training image of the set, using the second classifier neural network to determine a likelihood of the respective training image containing the target object, and updating weights of the second classifier neural network using a second loss function, different from the first loss function, wherein the second loss function is a monotonically-decreasing function of the determined likelihood when the training image contains the target object, and is a monotonically-increasing function of the determined likelihood when the training image does not contain the target object.

15. The computer processing system of claim 14, configured to train the first classifier neural network and the second classifier neural network alternately for a plurality of training cycles.

16. The computer processing system of claim 14, configured to:

train the first classifier neural network with the second classifier neural network operating in an inference mode;

update the weights of the first classifier neural network without changing any weights of the second classifier neural network;

train the second classifier neural network with the first classifier neural network operating in an inference mode; and update the weights of the second classifier neural network without changing any weights of the first classifier neural network.

17. The computer processing system of claim 14, wherein the pixels of the first training image identified by the first classifier neural network are pixels that are relatively more discriminative, for the first classifier neural network, than any other pixels of the image.

18. The computer processing system of claim 14, configured to identify the pixels of the first training image by applying a hard or soft threshold to attention-map data obtained using the first classifier neural network.

19. The computer processing system of claim 14, configured to train the first classifier neural network to favour identifying smaller sets of discriminative pixels by the first loss function additionally being a monotonically-increasing function of the number of pixels identified by the first classifier neural network, or of the sum of values in all or part of an attention map for the first training image generated using the first classifier neural network.

* * * * *